United States Patent
Limaye et al.

(10) Patent No.: US 10,166,508 B2
(45) Date of Patent: Jan. 1, 2019

(54) REACTIVE COMPONENT REDUCTION SYSTEM AND METHODS FOR THE USE THEREOF

(75) Inventors: Santosh Y. Limaye, El Cajon, CA (US); Stuart Robertson, Ramona, CA (US); Donald Koenig, San Diego, CA (US); Wesley Jung, San Diego, CA (US)

(73) Assignee: Phyre Technologies, Inc., El Cajon, CA (US)

( * ) Notice: Subject to any disclaimer, the term of this patent is extended or adjusted under 35 U.S.C. 154(b) by 1137 days.

(21) Appl. No.: 12/674,634

(22) PCT Filed: Aug. 20, 2008

(86) PCT No.: PCT/US2008/073729
§ 371 (c)(1),
(2), (4) Date: Jun. 30, 2011

(87) PCT Pub. No.: WO2009/026374
PCT Pub. Date: Feb. 26, 2009

(65) Prior Publication Data
US 2011/0262309 A1    Oct. 27, 2011

Related U.S. Application Data

(60) Provisional application No. 60/957,616, filed on Aug. 23, 2007.

(51) Int. Cl.
*B01D 53/88* (2006.01)
*B64D 37/32* (2006.01)
(Continued)

(52) U.S. Cl.
CPC ......... *B01D 53/885* (2013.01); *B01D 53/864* (2013.01); *B01J 8/02* (2013.01);
(Continued)

(58) Field of Classification Search
CPC ........ B01J 8/02; B01D 53/864; B01D 53/885; B01D 2256/22; B64D 37/32
(Continued)

(56) References Cited

U.S. PATENT DOCUMENTS 2,375,834 A * 5/1945 Walker .................. 220/88.3
2,670,873 A * 3/1954 Whidden ............... 220/88.3
(Continued)

FOREIGN PATENT DOCUMENTS

WO    WO-2006/076649    7/2006
WO    WO-2007/008730    1/2007

OTHER PUBLICATIONS

Limaye, Y. Santosh, Next Generation OBIGGS: Developments at Phyre Technologies. Presented at International Aircraft System Fire Protection Working Group, Nov. 2, 2005. Atlantic City, NJ. Retrieved from the Internet through the Internet Archive at https://archive.org using the Internat address: www.fire.tc.faa.gov/systems.stm.*
(Continued)

*Primary Examiner* — Lessanework Seifu
(74) *Attorney, Agent, or Firm* — Kilpatrick Townsend & Stockton LLP (57) ABSTRACT

In accordance with the present invention, there are provided simplified systems and methods for deactivating, removing, or reducing the levels of reactive component(s) from vapor phase fluids prior to introduction thereof into fuel storage tanks. The simple apparatus described herein can be utilized to replace complex systems on the market. Simply stated, in one embodiment of the invention, the vapor phase fluid contemplated for introduction into the fuel storage tank is passed through a reaction zone (e.g., a catalytic bed) operated at appropriate temperatures to allow the reaction between free reactive components therein (e.g., oxygen and
(Continued)

hydrogen or other fuel vapor), thereby deactivating reactive component(s) in the gas phase.

11 Claims, 8 Drawing Sheets

(51) Int. Cl.
    *B01J 8/02*     (2006.01)
    *B01D 53/86*     (2006.01)
(52) U.S. Cl.
    CPC .......... *B64D 37/32* (2013.01); *B01D 2256/12* (2013.01); *B01D 2256/22* (2013.01)
(58) Field of Classification Search
    USPC .................. 422/187, 211, 186.29, 186, 129; 423/210, 219; 220/88.3
    See application file for complete search history.

(56) References Cited

U.S. PATENT DOCUMENTS

| | | | | |
|---|---|---|---|---|
| 3,847,298 | A * | 11/1974 | Hamilton | 220/88.3 |
| 7,694,916 | B2 * | 4/2010 | Limaye et al. | 244/135 R |
| 7,905,259 | B2 * | 3/2011 | Johnson et al. | 141/64 |
| 2006/0113248 | A1 | 6/2006 | Koenig et al. | |

OTHER PUBLICATIONS

International Search Report and the Written Opinion dated Jan. 6, 2009 for PCT Application No. PCT/US2008/73729.

* cited by examiner

REACTIVE COMPONENT REDUCTION SYSTEM AND METHODS FOR THE USE THEREOF

FIELD OF THE INVENTION

The present invention relates to the field of on board reactive component removal systems, and reaction systems and methods for the removal of reactive components from vapor phase fluid prior to introduction thereof into fuel- or liquid chemical-containing vessels (e.g., vessels employed for fuel, flammable liquid or reactive liquid storage and/or transport). In a particular aspect, the invention relates to systems and methods for the catalytic removal of reactive components from vapor phase fluid prior to introduction thereof into fuel-containing vessels, specifically oxygen and/or fuel vapors, thereby reducing the potential for fire and explosion in such vessels.

BACKGROUND OF THE INVENTION

In order to avoid the potential fire and explosion hazard in vessels containing fuel, flammable liquid or reactive liquid (e.g., ships carrying flammable fluids as cargo, and the like), it is necessary to reduce the concentration of reactive components (e.g., oxygen and/or fuel vapors) in the gas phase that may be brought into contact with liquid fuel. Many different approaches have been taken in efforts to address this problem. One such approach, for example, involves the use of a membrane based gas separator to remove a sufficient amount of oxygen from the fluid stream which is to be introduced into the fuel-containing vessel so as to reduce the oxygen concentration below 5%. This reduced oxygen content gas is then used as an inert gas blanket in the fuel storage vessel.

Another method employed in the art involves use of a pressure swing adsorption system to separate the oxygen from air to generate oxygen depleted inert gas for introduction into the fuel-containing vessel.

These, as well as other systems described in the prior art require elaborate setup and add significantly to the cost of operation. Accordingly, there is a need for improved systems and methods for removing reactive components (e.g., oxygen and/or fuel vapors), or reducing the levels thereof, from the vapor phase used to fill the void-space in fuel-containing vessels.

SUMMARY OF THE INVENTION

In accordance with the present invention, there are provided simplified systems and methods for reducing the concentration of one or more reactive component(s) in vapor phase fluids introduced into the void space of fuel-containing vessels. The simple apparatus described herein can be utilized to replace complex systems on the market. Simply stated, in one embodiment of the invention, the vapor phase fluid to be introduced into a fuel-containing vessel is passed through a reaction zone (e.g., a catalytic bed) operated under conditions suitable to allow the consumption and/or inactivation of reactive components therein (e.g., free oxygen or other reactive vapors), thus deactivating reactive components in the gas phase.

In another embodiment of the present invention, there are provided systems for deactivating, reducing the concentration of, or removing one or more reactive components (e.g., oxygen and/or fuel vapors) from the vapor phase which is to be introduced into a fuel-containing vessel. Invention systems include a fluid treating zone (typically comprising a reaction zone having an inlet and outlet, wherein the reaction zone provides conditions suitable to deactivate the reactive components). Optionally, inventive systems include the ability to remove heat and or water from the vapor phase.

DETAILED DESCRIPTION OF THE PREFERRED EMBODIMENTS

In accordance with the present invention, there are provided systems for reducing the concentration of one or more reactive component(s) in a vapor phase fluid prior to introduction thereof into a container having fuel therein, thereby reducing the concentration of reactive component(s) in said vapor phase fluid below the concentration at which auto-ignition may occur when said vapor phase is introduced into said container. Invention systems comprise:
  said container, and
  a fluid treating zone comprising:
    at least one inlet,
    at least one outlet, and
    a reaction zone, wherein said reaction zone provides conditions suitable to deactivate said one or more reactive component(s) when contacted therewith,
  wherein only the outlet of said fluid treating zone is in fluid communication with the container, such that the inlet of said fluid treating zone has no communication with the container or contents thereof. Such systems are especially useful in applications where large quantities of volatile materials are being handled, e.g., in fuel transfer operations where large volumes of fuel are transferred from one vessel to another, such as occurs when the contents of fuel transport vessels are transferred from the transport vessel to a storage facility.

As readily recognized by those of skill in the art, there are a variety of reactive components which one may desirably wish to remove from vapor phase fluids (or reduce the concentration of in vapor phase fluids) when such fluids are brought into contact with fuel (such as fuel oil, diesel, jet fuel, marine fuel, and the like). One reactive component contemplated for treatment in accordance with the present invention is oxygen. Another reactive component contemplated for treatment in accordance with the present invention may also include fuel vapor, as well as a variety of additives and/or impurities commonly associated therewith. A particular advantage of the present invention relates to the fact that treatment of vapors as contemplated herein is accomplished via passage through the simple system described herein.

As employed herein, "deactivate" refers to the conversion of reactive components such as oxygen, fuel vapor, and the like, into substantially non-reactive species, i.e., species that are substantially inert under the conditions to which they are exposed. Preferably, deactivated species are non-flammable.

In one aspect of the present invention, reaction zones contemplated for use in the practice of the present invention comprise a catalyst which facilitates conversion of reactive component(s) to non-reactive component(s) when contacted therewith under suitable conditions. In one embodiment, catalyst can be contained within a vessel. When catalyst contemplated for use herein is contained in a vessel, the vessel can be equipped with an inlet end and an outlet end. In one aspect, the catalyst content can vary from the inlet end to the outlet end. In one aspect, the catalyst content can vary non-linearly from the inlet end to the outlet end, e.g., in one aspect, the catalyst content can increase from the inlet end to the outlet end. Alternatively, the catalyst content can decrease from the inlet end to the outlet end.

Alternatively, catalyst need not be contained within a vessel, instead existing in a form which allows passage of vapor phase fluid therethrough, or where the catalyst is supported in such a way that a separate vessel to contain the catalyst is not necessary.

Catalysts contemplated for use in the practice of the present invention include optionally supported metal catalysts, such as, for example, noble metals (e.g., platinum, palladium, gold, silver, and the like), precious metals, transition metals, metal oxides, rare earth oxides, nitrides, carbides, enzymes, and the like, as well as mixtures of any two or more thereof. "Catalytic" refers to facilitating a reaction or interaction involving one or more reactants. Catalytic materials may include noble metals, transition metals, metal oxides (e.g., transition metal oxides such as RuOx, LaMnOx and perovskites), and the like, as well as various combinations thereof.

Catalytic materials contemplated for use herein may optionally be supported on a variety of materials, such as for example, metallic supports, activated carbon, carbon black, and the like, as well as mixtures thereof. Inorganic oxides may also be employed as support materials, either alone or in combination, e.g., silica, alumina, silica-alumina, magnesia, titania, zirconia, montmorillonite, and the like, or combinations thereof, for example, silica-chromium, silica-titania, and the like.

When catalytic treatment of reactive components is employed, a wide variety of suitable conditions for contacting said catalyst with said one or more reactive component(s) are contemplated. Exemplary conditions comprise contacting the vapor phase materials with catalyst at a temperature in the range of about 25° C. up to about 1200° C. Presently preferred temperatures contemplated for use herein range from about 50° C. up to about 400° C. Even more preferred are temperatures ranging from about 100° C. up to about 350° C.

To facilitate control of the above-described catalytic process, invention systems can optionally further comprise a temperature modulator. Optionally, the temperature modulator can be a heat exchanger, which may include a heat exchange medium. The heat exchange medium can optionally include a liquid or external air. Optionally, heat exchange can be accomplished by evaporative cooling. As another alternative, heat exchange can be accomplished with a heat pump, an evaporative cooler, or the like.

The heat exchanger can be positioned in a variety of locations within the invention system, e.g. the heat exchanger can be associated with the catalyst containing vessel; or the heat exchanger can be positioned upstream or downstream from the catalyst containing vessel; or the heat exchanger may be integrated with the catalyst vessel.

When the temperature modulator is positioned upstream of the catalyst containing vessel, it is preferably used to pre-heat either the fuel vapor, air, or a mixture thereof. When the temperature modulator is positioned downstream of the catalyst containing vessel, it is preferably used to reduce the temperature of the vapor exiting the catalyst containing vessel. When the temperature modulator is associated with the catalyst containing vessel, it can be used to heat or cool the reaction vessel, as necessary, to provide conditions suitable for catalyzing reaction of oxygen with fuel vapor, thereby deactivating reactive components (e.g., oxygen and/or fuel vapor) in the fuel vapor and air mixture.

Alternative methods for treating reactive components in accordance with the present invention include employing a reaction zone which comprises a source of microwave energy sufficient to deactivate said one or more reactive component(s) when contacted therewith.

As yet another alternative method for treating reactive components in accordance with the present invention, a reaction zone can be employed which comprises a source of plasma energy sufficient to deactivate said one or more reactive component(s) when contacted therewith.

Optionally, invention systems may further comprise a flame arrestor between the fuel storage tank and the fluid treatment zone (e.g., a water lock) so as to prevent any possibility of combustion to communicate between the fuel storage tank and the fluid treatment zone. Alternatively, the fluid treatment zone can be designed so as to prevent any flame formation.

Additional optional features which may be included in invention systems include one or more sensors (e.g., oxygen sensors, chemical sensors, carbon dioxide sensors, nitrogen oxide ($NO_x$) sensors, and the like), which may be positioned upstream and/or downstream from the fluid treatment zone so as to monitor the levels of chemicals of interest (e.g., oxygen, hydrocarbons, $CO_2$, $NO_x$, and the like) in the inlet and/or outlet gas thereof. Additionally, a feedback loop could be provided so as to adjust the contacting conditions within the fluid treatment zone as a function of the chemical levels detected before and/or after the reaction zone.

Thus, in one aspect of the present invention, sensors contemplated for use herein can be in fluid communication with the inlet of the fluid treating zone, and such sensors can be employed to control the passage of vapor through the fluid treating zone in response to the reactive species content thereof For example, if the oxygen level of the vapor subject to treatment herein is below a target value, said vapor can be introduced directly into said container, without the need to pass through the fluid treating zone. Conversely, if the oxygen level of the vapor subject to treatment herein is above a target value, said vapor can be recycled through the fluid treating zone for further treatment before being introduced into said container.

As used herein, the term "upstream" refers to an element in a flow scheme which is located prior to or before a reference point or reference element. As used herein, the term "downstream" refers to an element in a flow scheme which is located after a reference point or reference element.

In certain embodiments of the invention, the system may also include a fluid purification module adapted to remove water from the treated air. For example, the fluid purification module may include a condenser to reduce the temperature of the treated vapor below the dew point, thereby facilitating removal of any excess water. In a particular embodiment, the fluid purification module may include a pressure swing adsorption module. In other embodiments, the purification module may include membranes. A recirculation line may be provided to transfer the fluid from the fluid purification module to the inlet to the reaction zone. The fluid purification module may be located upstream or downstream from the reaction zone. In other embodiments, water may be removed by a moisture trap.

As used herein, "purification" and "purifying" refer to the removal from a fluid of one or more components. The removal may be partial, complete or to a desired level and may include removal of only some or all components.

In one embodiment, the system may also include a recirculation line adapted to transfer the fluid from the separator to the inlet of the reaction zone.

In one embodiment, the system may also include a vapor trap adapted to separate vaporized liquid mixed with the fluid from the separator.

Containers contemplated for use herein are typically provided with at least one outlet for removal of fuel therefrom and at least one inlet for introduction of vapor thereto. Such containers may optionally contain a venting system in communication with the atmosphere to allow pressure equilibration. Such containers may further optionally contain one or more elements which monitor flow rate of the vapor phase, and/or the level of reactive component(s) in said vapor phase. The output of such elements can be communicated to one or more elements which control the flow rate of the vapor phase (e.g., in response to the level of reactive component(s) in said vapor phase).

In certain embodiments of the present invention, the fluid treating zone is external to said container. In such embodiments, invention systems may optionally further comprise one or more heat exchangers upstream and/or downstream of said reaction zone.

In other embodiments of the present invention, the fluid treating zone is within said container.

In certain embodiments of the present invention, invention systems may further comprise one or more elements suitable for equilibrating pressure within the system upon exposure to sub- or super-atmospheric conditions. Exemplary elements for equilibrating pressure include a source of make-up fluid to equilibrate pressure within the system upon exposure to sub-atmospheric conditions; a vent to equilibrate pressure within the system upon exposure to super-atmospheric conditions; one or more flexible members, thereby providing one or more elements suitable for equilibrating pressure within the system, and the like.

In additional embodiments of the present invention, invention systems further comprise an independent source of reactive material to facilitate deactivation of the reactive components within the reaction zone. Exemplary independent sources of such reactive materials include hydrogen, fuel, and the like.

In accordance with another aspect of the present invention, there are provided systems for introducing reactive component-depleted air into a container having fuel therein as fuel is withdrawn therefrom. Invention systems comprise:
a fluid treating zone comprising:
at least one inlet,
at least one outlet, and
a reaction zone, wherein said reaction zone provides conditions suitable to deactivate said one or more reactive component(s) when contacted therewith,
a source of air, wherein the source of air is in fluid communication with the inlet of the fluid treating zone,
a source of fuel, wherein the source of fuel is in fluid communication with the inlet of said fluid treating zone, and
optionally a filter/condenser, wherein when the filter/condenser is present, the fluid treating zone is in fluid communication with the inlet of the filter/condenser, and the outlet of the filter/condenser is in fluid communication with the container,
wherein said fluid treating zone operates under conditions suitable to remove or reduce the concentration of reactive component in the source of air when contacted therewith in the presence of fuel, and is in fluid communication with the container.

Systems as contemplated hereinabove are useful for a variety of applications, i.e., for filling the void created by withdrawal of fuel from a storage container with air which has been treated so as to substantially reduce the risk of ignition thereof.

In accordance with the present invention, there are provided systems for displacing fuel in, or vapor in the vapor space of, a container having fuel therein with reactive component-depleted air. Invention systems comprise:
a fluid treating zone comprising:
at least one inlet,
at least one outlet, and
a reaction zone, wherein said reaction zone provides conditions suitable to deactivate said one or more reactive component(s) when contacted therewith,
a source of air, wherein the source of air is in fluid communication with the inlet of the fluid treating zone,
a source of fuel, wherein the source of fuel is in fluid communication with the inlet of said fluid treating zone, and
optionally a filter/condenser, wherein when the filter/condenser is present, the fluid treating zone is in fluid communication with the inlet of the filter/condenser, and the outlet of the filter/condenser is in fluid communication with the container,
wherein said reaction zone provides conditions suitable to remove or reduce the concentration of reactive component(s) in the source of air when contacted therewith in the presence of fuel vapor, wherein the reaction zone is in fluid communication with the container.

Systems as contemplated hereinabove are useful for a variety of applications, i.e., for filling the void created by withdrawal of fuel from a storage container with air which has been treated so as to substantially reduce the risk of ignition thereof.

In accordance with the present invention, there are provided systems for reducing the concentration of one or more reactive component(s) in a vapor phase fluid prior to introduction thereof into a container having fuel therein, thereby reducing the concentration of reactive component(s) in said vapor phase fluid below the concentration at which auto-ignition may occur when said vapor phase fluid is introduced into said container. Invention systems comprise:
said container, and
a fluid treating zone comprising:
at least one inlet,
at least one outlet, and
a catalyst zone, said catalyst zone comprising an optionally supported metal catalyst, said catalyst being reactive with one or more reactive component(s) when contacted therewith under suitable conditions so as to deactivate said one or more reactive component(s),
wherein only the outlet of said fluid treating zone is in fluid communication with the container, such that the inlet of said fluid treating zone has no communication with the container or contents thereof.

Systems as contemplated hereinabove are useful for a variety of applications, i.e., for filling the void created by withdrawal of fuel from a storage container with air which has been treated so as to substantially reduce the risk of ignition thereof.

In accordance with the present invention, there are provided fuel storage systems, said systems comprising:
  a container having an outlet for removal of vapor therefrom, and an inlet for return of vapor thereto, and
  a reaction zone which provides conditions suitable to deactivate one or more reactive component(s) in the vapor phase of said container when contacted therewith,
wherein said container and the reaction zone are in fluid communication with one another.

Systems as contemplated hereinabove are useful for a variety of applications, i.e., inerting the void-space in a fuel storage container so as to substantially reduce the risk of ignition thereof.

In accordance with the present invention, there are provided methods for displacing fuel in, or vapor in the vapor space of, a container having fuel therein with reactive component-depleted air as fuel is withdrawn from the container, said method comprising:
  combining air with vaporized fuel,
  passing the resulting combination through a fluid treating zone under conditions suitable to produce reactive component-depleted air,
  optionally removing any water from the reactive component-depleted air to produce substantially water-free, reactive component-depleted air, and
  introducing the resulting substantially water-free, reactive component-depleted air into said container as fuel is withdrawn therefrom.

Methods as contemplated hereinabove are useful for a variety of applications, i.e., for filling the void created by withdrawal of fuel from a storage container with air which has been treated so as to substantially reduce the risk of ignition thereof.

In accordance with the present invention, there are provided methods for displacing the vapor in the vapor space of a container employed for the storage of fuel therein with reactive component-depleted air as fuel-containing vapor is withdrawn from the container, and prior to the introduction of fuel into said container, said method comprising:
  introducing ambient air, optionally in combination with a fuel material, into a fluid treating zone under conditions suitable to produce reactive component-depleted air,
  optionally removing any water from the reactive component-depleted air to produce substantially water-free, reactive component-depleted air, and
  introducing the resulting substantially water-free, reactive component-depleted air into said container as fuel-containing vapor is withdrawn therefrom.

Methods as contemplated hereinabove are useful for a variety of applications, i.e., for filling the void created by withdrawal of fuel from a storage container with air which has been treated so as to substantially reduce the risk of ignition thereof.

In accordance with the present invention, there are provided methods for inerting the vapor space of a container employed for the storage of fuel therein, said method comprising replacing the vapor in said container, prior to the introduction of fuel into said container, with reactive component-depleted air prepared as described herein. For example, said method can be accomplished by:
  passing ambient air, optionally in combination with a fuel material, through a fluid treating zone under conditions suitable to produce reactive component-depleted air, and
  optionally removing any water from the reactive component-depleted air to produce substantially water-free, reactive component-depleted air.

Methods as contemplated hereinabove are useful for a variety of applications, i.e., for filling the void created by withdrawal of fuel from a storage container with air which has been treated so as to substantially reduce the risk of ignition thereof.

The invention will now be described in greater detail with reference to the Figures, which are illustrative of various embodiments of the invention. While the exemplary embodiments illustrated in the Figures and described herein are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

Figure 1:
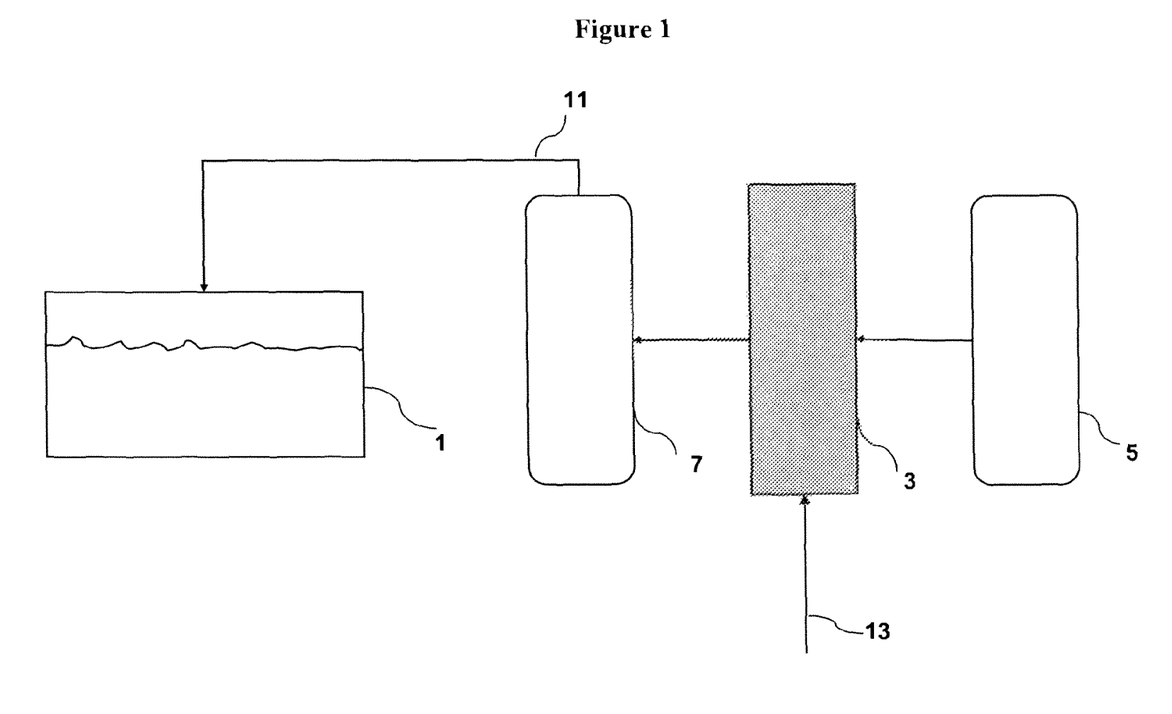
FIG. 1 is a schematic illustration of one embodiment of a reactive component reduction system according to the invention.

FIG. 1 is a schematic illustration of one embodiment of the present invention. Inerted air is introduced into fuel-containing vessel 1 via line 11. Inerted air is prepared by introducing ambient air into reaction zone 3 via line 13. Reaction zone 3 may optionally also be supplied with an auxiliary fuel source, such as from vessel 5. The combination of ambient air and fuel passes through reaction zone 3, and optionally through heat exchanger 7 before being introduced into fuel-containing vessel 1 via line 11.

Figure 2:
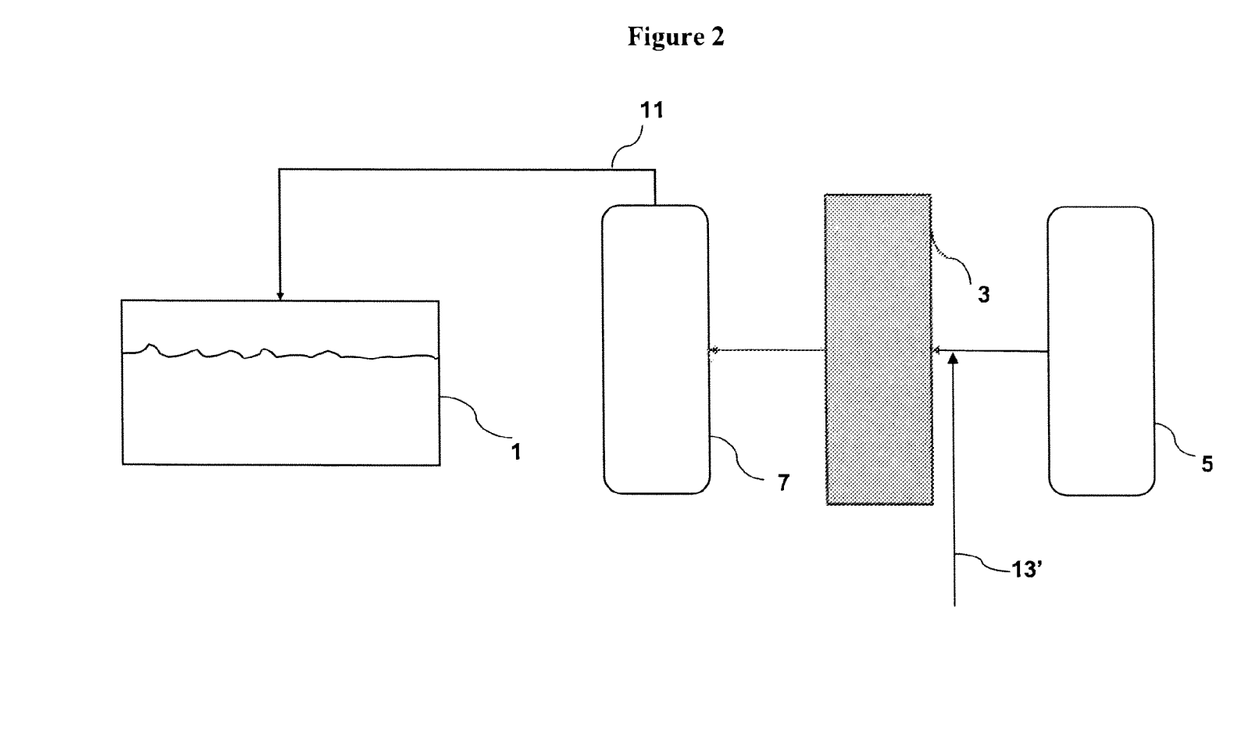
FIG. 2 is a schematic illustration of another embodiment of a reactive component reduction system according to the invention.

FIG. 2 is a schematic illustration of another embodiment of the present invention, which is a variant of the embodiment illustrated in FIG. 1. Thus, in FIG. 2 ambient air (via line 13 and fuel from vessel 5 are pre-mixed prior to introduction into reaction zone 3. While only illustrated herein with respect to the embodiment illustrated in FIG. 1, those of skill in the art will recognize that pre-mixing of ambient air with fuel can be employed with any of the other embodiment of the invention, instead of the direct introduction of ambient air into the reaction zone, as illustrated herein (merely for convenience and clarity).

Figure 3:
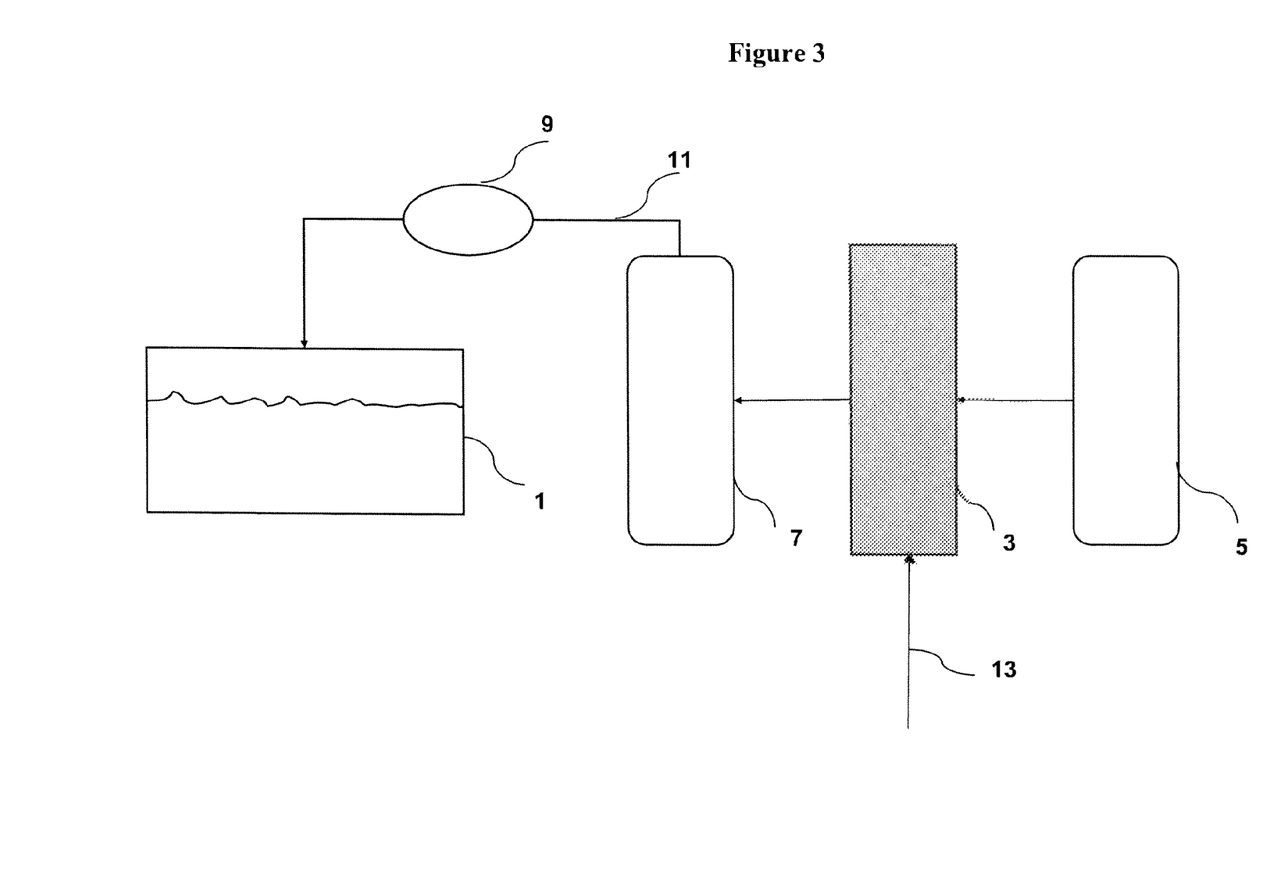
FIG. 3 is a schematic illustration of yet another embodiment of a reactive component reduction system according to the invention.

FIG. 3 is a schematic illustration of another embodiment of the invention reactive component reduction system shown in FIG. 1, wherein water lock 9 is inserted in line 11 to prevent fluid vapors from fuel-containing vessel 1 backing up into reaction zone 3.

Figure 4:
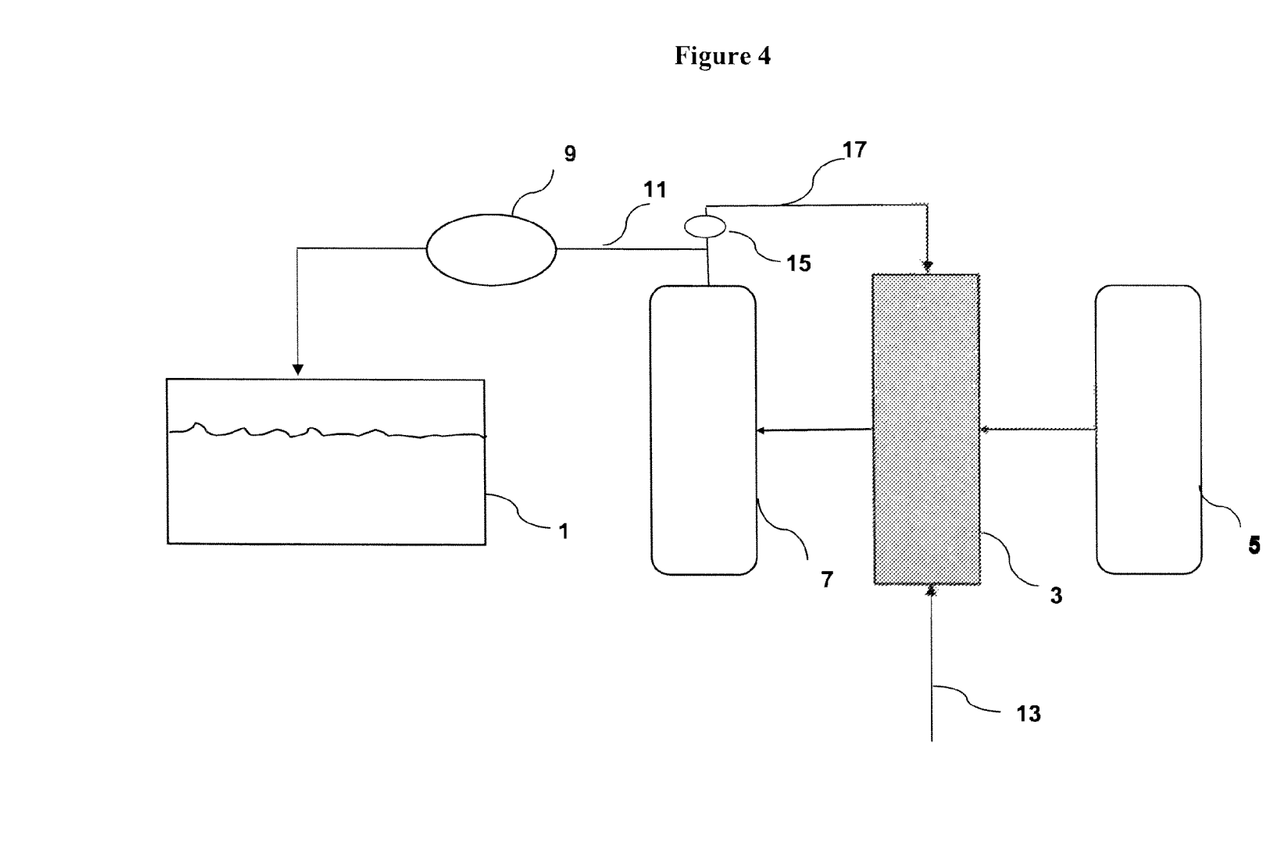
FIG. 4 is a schematic illustration of still another embodiment of a reactive component reduction system according to the invention.

FIG. 4 is a schematic illustration of yet another embodiment of a reactive component reduction system according to the invention, further provided with one or more sensor 15 (which sensor(s) are capable of monitoring the content of reactive material(s) in the fluids which have passed through reaction zone 3), and recycle/return line 17 (which allows fluid vapors to be recycled for further treatment as needed if the content of reactive materials therein is higher than acceptable, or bypass of reaction zone 3 if the content of reactive materials therein is acceptably below the flammability limit).

Figure 5:
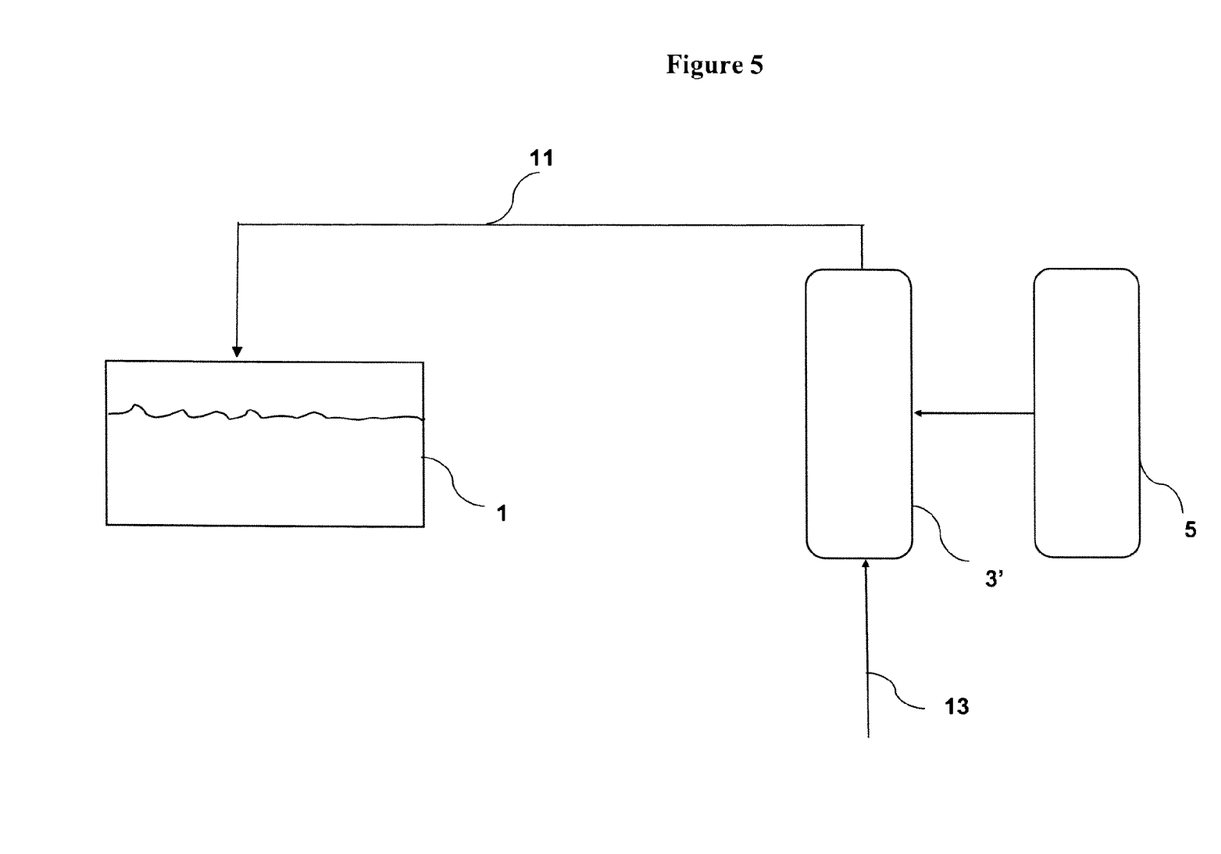
FIG. 5 is a schematic illustration of a further embodiment of a reactive component reduction system according to the invention.

FIG. 5 is a schematic illustration of still another embodiment of a reactive component reduction system according to the invention, wherein the heat exchange function is integrated with the reaction zone, shown in the figure as reaction zone 3'.

Figure 6:
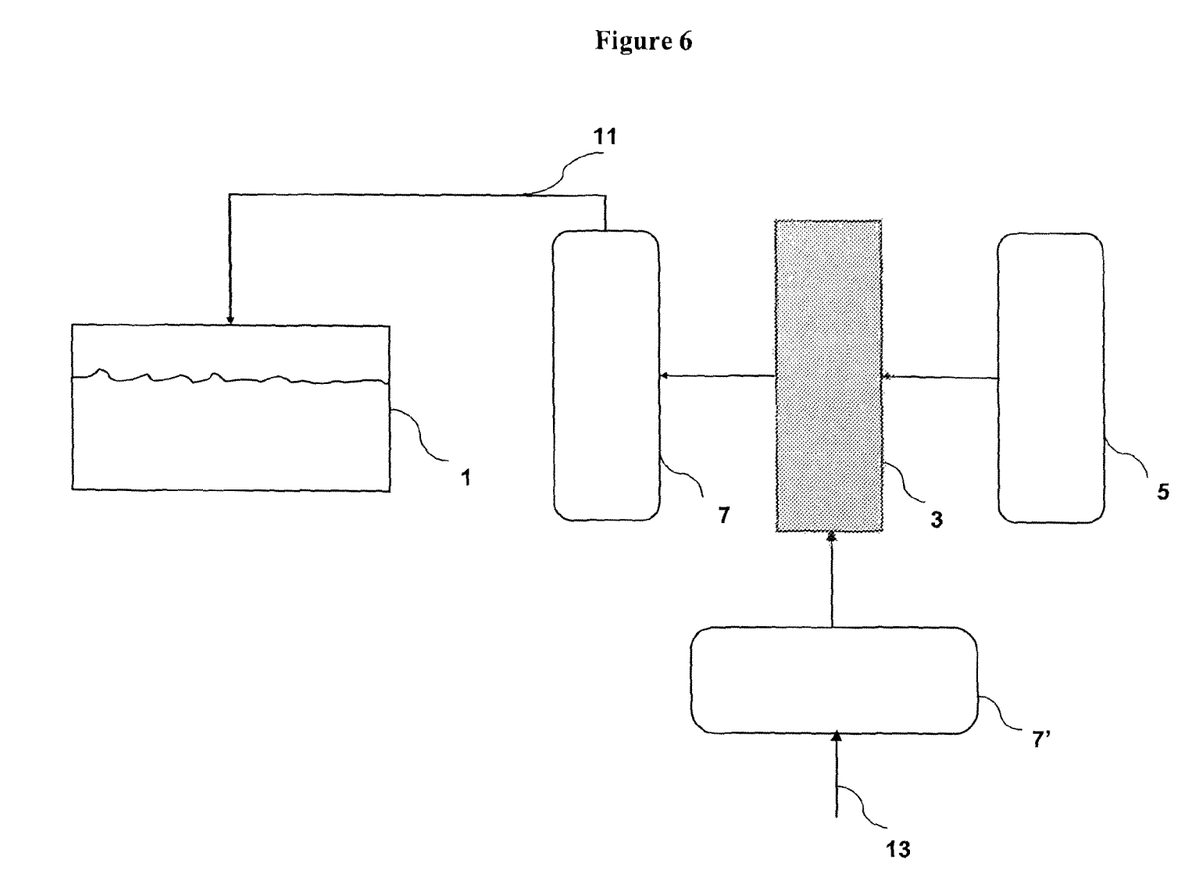
FIG. 6 is a schematic illustration of a still further embodiment of a reactive component reduction system according to the invention.

FIG. 6 is a schematic illustration of a further embodiment of a reactive component reduction system according to the invention, further comprising an additional heat exchanger (i.e., heat exchanger 7') to facilitate modulating the temperature of ambient air introduced into reaction zone 3.

Figure 7:
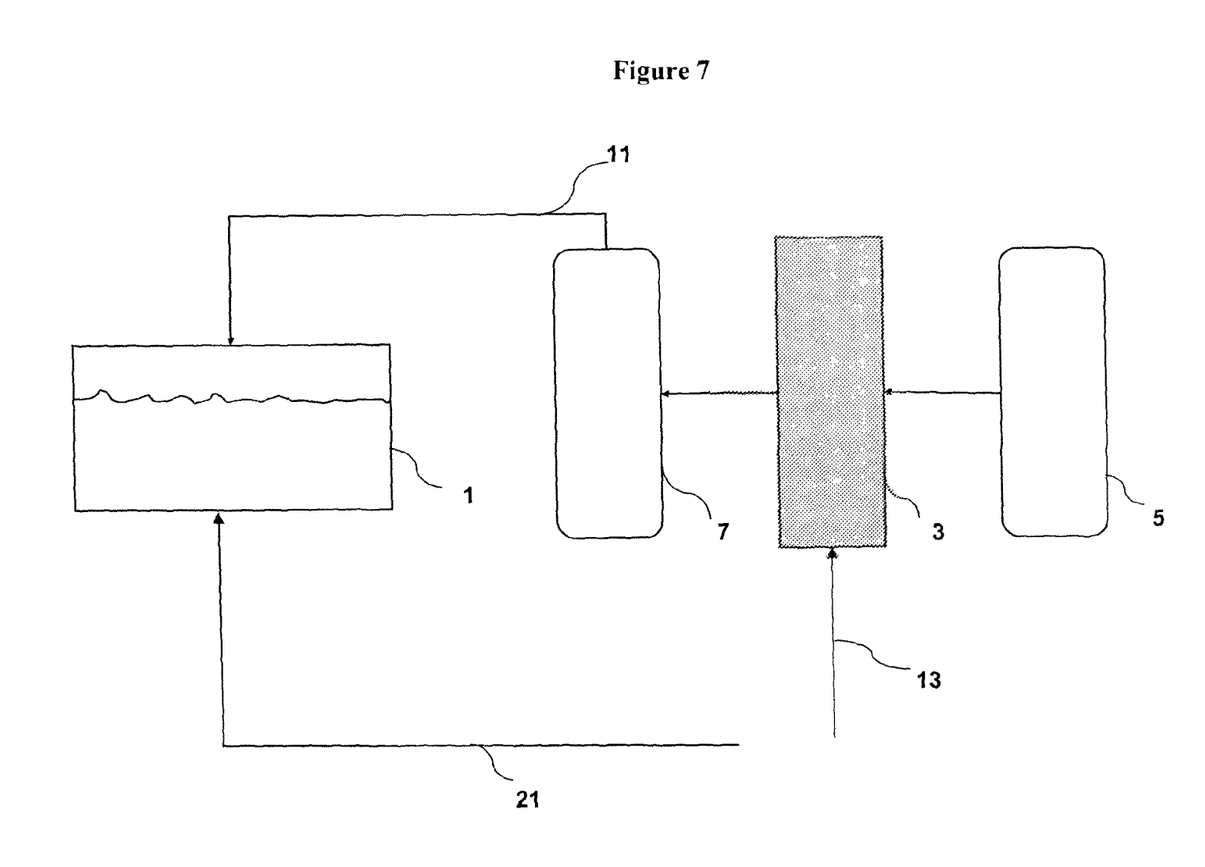
FIG. 7 is a schematic illustration of still another embodiment of a reactive component reduction system according to the invention.

FIG. 7 is a schematic illustration of a still further embodiment of a reactive component reduction system according to the invention, further comprising by-pass line 21 which facilitates direct introduction of ambient air into fuel-containing vessel 1 in the event the content of reactive materials therein is acceptably below the flammability limit.

Figure 8:
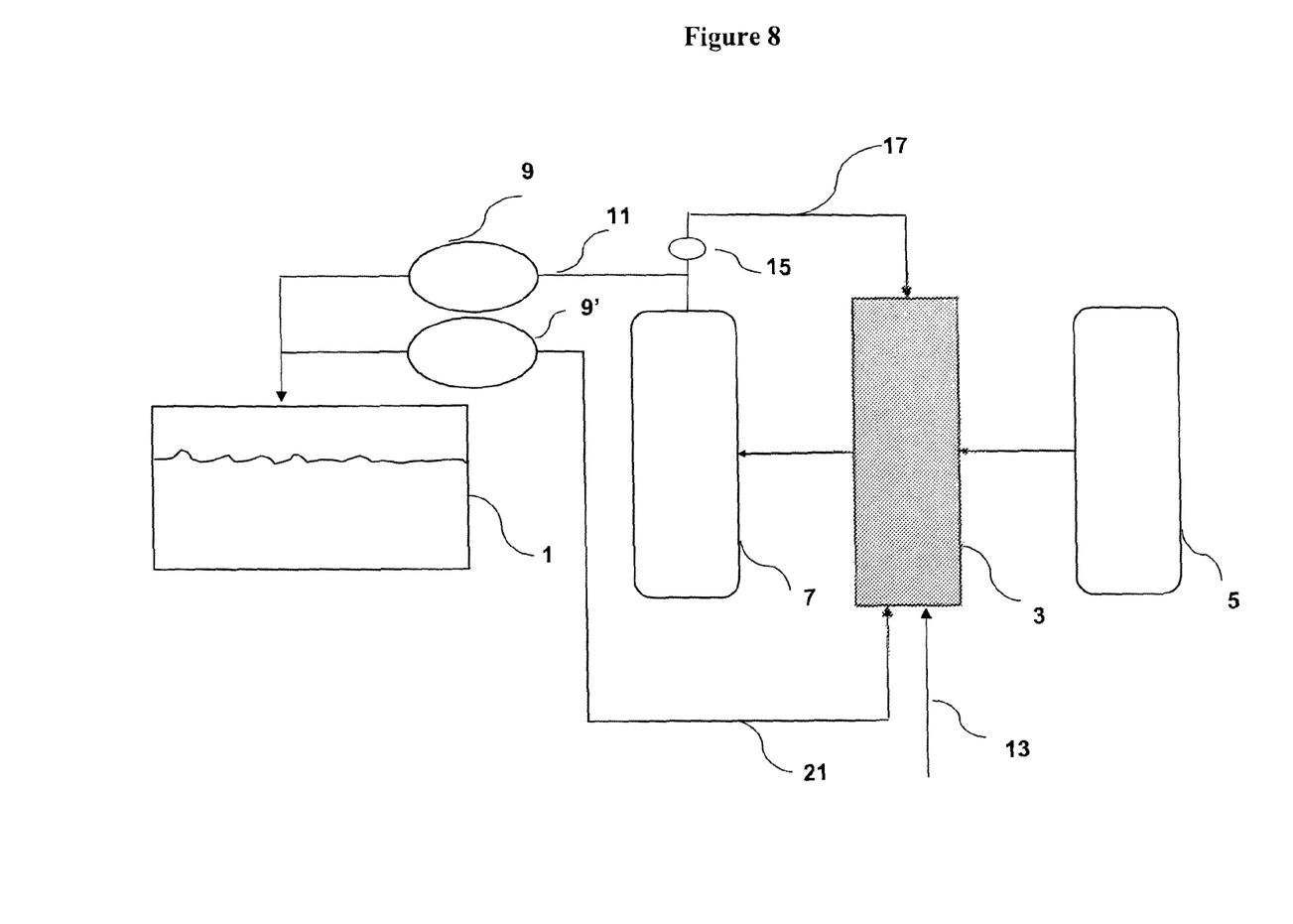
FIG. 8 is a schematic illustration of yet another embodiment of a reactive component reduction system according to the invention.

FIG. 8 is a schematic illustration of still another embodiment of a reactive component reduction system according to the invention, representing one of the possible combinations of features contemplated for use in the practice of the present invention.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

That which is claimed is:

1. A system for reducing the concentration of one or more reactive component(s) in a vapor phase fluid prior to contacting thereof with fuel, wherein said system reduces the concentration of reactive component(s) in said vapor phase fluid below the concentration at which auto-ignition may occur when said vapor phase fluid is contacted with fuel, said system comprising:
   a fuel container,
   a fluid treating zone comprising:
      at least one inlet,
      at least one outlet, and
      a reaction zone, wherein said reaction zone provides conditions suitable to deactivate said one or more reactive component(s) when contacted therewith,
   an independent source of fuel vapor, and
   a flame arrestor,
      wherein only the outlet of said fluid treating zone is in fluid communication with the fuel, such that the inlet(s) of said fluid treating zone has/have no communication with the fuel, and
      wherein said fluid treating zone is within said container.

2. The system of claim 1 wherein said fluid treating zone comprises a catalyst which facilitates conversion of reactive component(s) to non-reactive component(s) when contacted therewith under suitable conditions.

3. The system of claim 1 wherein said reaction zone comprises a source of microwave energy sufficient to deactivate said one or more reactive component(s) when contacted therewith.

4. The system of claim 1 wherein said reaction zone comprises a source of plasma energy sufficient to deactivate said one or more reactive component(s) when contacted therewith.

5. The system of claim 1, further comprising one or more elements which monitor flow rate of the vapor phase, and/or the level of reactive component(s) in said vapor phase.

6. The system of claim 1 further comprising one or more elements suitable for equilibrating pressure within the system upon exposure to sub- or super-atmospheric conditions.

7. The system of claim 1 further comprising an independent source of fuel to facilitate deactivation of the reactive components within the reaction zone.

8. The system of claim 1 further comprising one or more sensors before and/or after the fluid treating zone.

9. A method for displacing fuel in, or vapor in the vapor space of, a container having fuel therein with reactive component-depleted air as fuel is withdrawn from the container, said method consisting essentially of:
   combining air with vaporized fuel in a system according to claim 1,
   passing the resulting combination through a fluid treating zone under conditions suitable to produce reactive component-depleted air,
   optionally removing any water from the reactive component-depleted air to produce substantially water-free, reactive component-depleted air, and
   introducing the resulting substantially water-free, reactive component-depleted air into said container as fuel is withdrawn therefrom.

10. A method for displacing the vapor in the vapor space of a container employed for the storage of fuel therein with reactive component-depleted air as fuel-containing vapor is withdrawn from the container, said method consisting essentially of:
   introducing ambient air, optionally in combination with a fuel material, into a fluid treating zone in a system according to claim 1 under conditions suitable to produce reactive component-depleted air,
   optionally removing any water from the reactive component-depleted air to produce substantially water-tree, reactive component-depleted air, and
   introducing the resulting substantially water-free, reactive component-depleted air into said container as fuel-containing vapor is withdrawn therefrom.

11. A method for inerting the vapor space of a container employed for the storage of fuel therein, said method comprising replacing the vapor in said container, prior to the introduction of fuel into said container, with reactive component-depleted air prepared by:
   passing ambient air, optionally in combination with a fuel material, through a fluid treating zone in a system according to claim 1 under conditions suitable to produce reactive component-depleted air, and
   optionally removing any water from the reactive component-depleted air to produce substantially water-free, reactive component-depleted air.

* * * * *